US006985863B2

(12) United States Patent
Itoh et al.

(10) Patent No.: US 6,985,863 B2
(45) Date of Patent: Jan. 10, 2006

(54) SPEECH RECOGNITION APPARATUS AND METHOD UTILIZING A LANGUAGE MODEL PREPARED FOR EXPRESSIONS UNIQUE TO SPONTANEOUS SPEECH

(75) Inventors: Nobuyasu Itoh, Yokohama (JP); Masafumi Nishimura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/056,149

(22) Filed: Jan. 24, 2002

(65) Prior Publication Data
US 2002/0156627 A1    Oct. 24, 2002

(30) Foreign Application Priority Data
Feb. 20, 2001   (JP)   .............................. 2001-044186

(51) Int. Cl.
   *G10L 15/18*   (2006.01)
   *G10L 15/04*   (2006.01)
(52) U.S. Cl. ...................... 704/257; 704/251; 704/254
(58) Field of Classification Search ................ 704/257, 704/251, 252, 255
   See application file for complete search history.

(56) References Cited

U.S. PATENT DOCUMENTS

| | | | | |
|---|---|---|---|---|
| 5,875,425 | A | * | 2/1999 | Nakamura et al. .......... 704/231 |
| 6,067,514 | A | * | 5/2000 | Chen .......................... 704/235 |
| 6,167,377 | A | * | 12/2000 | Gillick et al. ............... 704/240 |
| 6,314,399 | B1 | * | 11/2001 | Deligne et al. ............. 704/257 |
| 6,393,398 | B1 | * | 5/2002 | Imai et al. ................... 704/254 |
| 2002/0087315 | A1 | * | 7/2002 | Lee et al. ................... 704/256 |
| 2003/0023437 | A1 | * | 1/2003 | Fung .......................... 704/236 |

OTHER PUBLICATIONS

Siu et al., "Modeling disfluencies in conversational speech", ICSLP 96, Oct. 3-6, 1996, vol.: 1, pp. 386-389.*
Lickley et al., "On not recognizing disfluencies in dialogue", ICSLP 96, Oct. 3-6, vol.: 3, pp. 1876-1879.*
Suhm et al., "Towards Better Language Models for Spontaneous Speech", ICSLP 94, Yokohama, vol. 2, pp. 831-834.*
Kemp et al., "Modelling unknown words in spontaneous speech", ICASSP-96, May 7-10, 1996, vol.: 1, pp. 530-533.*
Rose et al., "Modeling disfluency and background events in ASR for a natural language understanding task", ICASSP '99, Mar. 15-19, 1999, vol.: 1, 341-344.*

(Continued)

*Primary Examiner*—Susan McFadden
*Assistant Examiner*—Brian L. Albertalli
(74) *Attorney, Agent, or Firm*—Akerman Senterfitt

(57) ABSTRACT

A speech recognition apparatus can include a transformation processor configured to transform at least one phoneme sequence included in speech into at least one word sequence, and to provide the word sequence with an appearance probability indicating that the phoneme sequence originally represented the word sequence. A renewal processor can renew the appearance probability based on a renewed numerical value indicated by language models corresponding to the word sequence provided by the transformation processor. A recognition processor can select one of the word sequences for which the renewed appearance probability is the highest to indicate that the phoneme sequence originally represented the selected word sequence. The renewal processor can calculate the renewed numerical value using a first language model prepared for expressions unique to spontaneous speech, and a second language model different from the first which employs the renewed numerical value to renew the appearance probability.

20 Claims, 12 Drawing Sheets

OTHER PUBLICATIONS

Siu et al., "Variable n-grams and extensions for conversational speech language modeling", IEEE Transactions on Speech and Audio Processing, Jan. 2000, vol.: 8, Issue: 1, pp. 63-75.*

Schultz et al., "Acoustic and language modeling of human and nonhuman noises for human-to-human spontaneous speech recognition", ICASSP-95, May 9-12, 1995, vol.: 1, PP. 293-296.*

U.S. Appl. No. 09/748,542, filed Dec. 26, 2000, Itoh et al.

L.R. Bahl, et al., *A Maximum Likelihood Approach to Continuous Speech Recognition, IEEE Transactions*, vol. PAMI-5, No. 2, (Mar. 1983).

N. Masafumi, et al., *Word-Based Approach to Large-Vocabulary Continuous Speech Recognition for Japanese, Information Processing Society of Japan*, vol. 40, No. 4, (Apr. 1999).

Kai et al., *Information Processing Society of Japan, Dealing with Out-of-Vocabulary Words and Filled Pauses in Word N-Gram Based Speech Recognition System*, vol. 40, No. 4, (Apr. 1999).

A. Stolcke, et al.,*Statistical Language Modeling for Speech Disfluencies, IEEE Proc. of ICASSP96*, (1996).

*IBM ViaVoice98 Application Edition*, Info-Creates Publication Dept., (Sep. 30, 1998).

E. Charniak, *Hidden Markov Models and Two Applications, Statistical Language Learning*, MIT Press, pp. 39-43, (1999).

Japenese Office Action and Translation in Priority Application No. JP2001-044186 (transmitted Nov. 16, 2004).

Okato, Y., et al, "Keyword Spotting of Spoken Dialog Utterances Using Newspaper Language Model", Collection of Theses by Japanese Academic Society of Acoustics, No. 3-6-18, pp. 117-118. (Mar. 17, 1998).

* cited by examiner (a) Case wherein a disfluency language model is OFF
"..., koregaehonhatsumeinoyouten ..."
→ "..., kore ga e − hon hatsu − mei no you − ten"

(b) Case wherein a disfluency language model is ON
"..., koregaehonhatsumeinoyouten ..."
→ "..., kore ga <er> hon − hatsumei no you − ten ..."

(a) Case wherein a disfluency language model is OFF and a punctuation language model is OFF
"..., korega (pause) (ten) ehonhatsumeino (pause) youten..."
→ "..., kore ga, e – hon – hatsu – mei no you – ten ..."

(b) Case wherein a disfluency language model is OFF and a punctuation language model is ON
"..., korega (pause) ehonhatsumeino (pause) youten..."

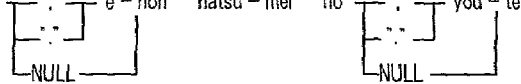

→ "..., kore ga, e – hon – hatsu – mei no you – ten ..."

(c) Case wherein a disfluency language model is ON and a punctuation language model is OFF
"..., korega (pause) (ten) ehonhatsumeino (pause) youten..."
→ "..., kore ga, <er> hon – hatsu – mei no you – ten ..."

(d) Case wherein a disfluency language model is OFF and a punctuation language model is ON
"..., korega (pause) ehonhatsumeino (pause) youten..."

→ "..., kore ga, <er> hon – hatsu – mei no you – ten ..."

Fig. 8

SPEECH RECOGNITION APPARATUS AND METHOD UTILIZING A LANGUAGE MODEL PREPARED FOR EXPRESSIONS UNIQUE TO SPONTANEOUS SPEECH

CROSS REFERENCE TO RELATED APPLICATIONS

This application claims the benefit of Japanese Application No. 2001-044186, filed Feb. 20, 2001.

BACKGROUND OF THE INVENTION

1. Technical Field

The present invention relates to recognizing the natural speech of a person and converting the speech into text, and more particularly, to automatically removing meaningless words called disfluencies from the derived text.

2. Description of the Related Art

A statistic method for performing speech recognition using an acoustic model and a language model is disclosed in, for example, "A Maximum Likelihood Approach to Continuous Speech Recognition", L. R. Bahl et al. IEEE Trans. Vol. PAMI-5, No. 2, March 1983; or in "Word-based Approach To Large-vocabulary Continuous Speech Recognition For Japanese", Nishimura, et al., Information Processing Thesis, Vol. 40, No. 4, April, 1999. Further, an N-gram estimate, a common language model technique, is disclosed on page 15 of IBM ViaVoice98 Application Edition (Info-creates Publication Department, issued on Sep. 30, 1998).

Disfluencies, such as "eh", frequently appear during the recognition of natural speech and are important for applications. "Statistical Language Modeling for Speech Disfluencies", by A. Stolcke and E. Shriberg, Proc. of ICASSP96, discloses a method for handling such disfluencies in the N-gram model and automatically removing them from the recognition result. With this method, however, it is difficult to avoid a phenomenon whereby the validity of a word when originally used is not recognized and the word is thereafter determined to be a disfluency and removed. Further, the kind and frequency of disfluencies varies depending on the speaker and the speaking environment (e.g., with or without a draft and in a formal or an informal setting), making it difficult to use an average model for the prediction of disfluencies.

SUMMARY OF THE INVENTION

It is one object of the present invention to provide a function for setting a model that is appropriate for the removal of disfluencies by using information that is designated by a user or that is obtained during the registration of a speaker. Accordingly, a general-purpose language model as well as a disfluency language model are included as language models to facilitate the automatic removal of disfluencies.

A speech recognition means in wide use today employs a vocabulary/language model (called a topic) that is prepared for a specific field, such as computers, and used in conjunction with a general-purpose language model to improve the recognition accuracy for the pertinent field. A topic having a comparatively small size can be prepared for which setting the ON/OFF state is easy. Thus, according to the present invention, the vocabulary/language model used for removing disfluencies is prepared as a topic.

Specifically, according to the present invention, a dictionary in which disfluencies such as "eh" and "well", as well as normal words, are registered, is prepared along with a Baseform Pool that includes their pronunciations. When disfluencies (<eh> or <well>) do arise, however, to efficaciously and easily distinguish the disfluencies from normal words during a subsequent removal process, a special symbol (e.g., a "not equal" symbol) is used to mark them. Furthermore, a special language model for predicting disfluencies is prepared as a topic. Since the language model for disfluency prediction is used as an element of an N-gram language model including disfluencies, and in the colloquial expressions unique to spontaneous speech, the language model for the disfluency prediction can be much smaller than the general-purpose language model. When this language model is linearly interpolated with the general-purpose language model using the following equation (1), the accuracy for the prediction of a disfluency can be improved.

$$Pr(w1|w2, w3) = \lambda P1(w1|w2, w3) + (1-\lambda)P2(w1|w2, w3) \quad (1)$$

For the example in equation (1), N=3 and $0 < \lambda \leq 1$, P1 denotes the probability using a general-purpose language model, and P2 denotes the probability using the language model (disfluency language model) of a disfluency topic.

The present invention is provided based on the above-described subject matter. A speech recognition apparatus can include a transformation processor for transforming a phoneme sequence or sequences included in speech into a word sequence or sequences, and for providing, for the word sequence or sequences, an appearance probability indicating that the phoneme sequence originally represented the word sequence or sequences; a renewal processor for renewing the appearance probability, provided for the word sequence or sequences by the transformation means, based on a renewed numerical value indicated by language models corresponding to the word sequence or sequences provided by the transformation processor; and a recognition processor for selecting the word sequence, or one of the word sequences for which the renewed appearance probability is the highest, to indicate that the phoneme sequence or sequences originally represented the selected word sequence, and for recognizing the speech. The renewal processor can calculate the renewed numerical value using a first language model, which is especially prepared for expressions unique to spontaneous speech, and a second language model, which differs from the first language model, and employs the renew numerical value to renew the appearance probability.

A disfluency is included in a word set related to an expression unique to spontaneous speech. Therefore, according to the invention, without limiting it to disfluencies, the first language model is included for the expression unique to spontaneous speech. Expressions unique to spontaneous speech are, for example, "I mean" and "you know".

In the speech recognition apparatus of the invention, the first language model represents a probability that the word sequence which includes a predetermined word included in an expression unique to spontaneous speech is the word sequence, the phoneme sequence, or sequences originally represented.

According to the speech recognition apparatus of the invention, when the predetermined word is included in the speech recognition results, the transformation processor transforms the phoneme sequence or sequences into a word sequence included in the predetermined word, and the renewing processor renews the appearance probabilities of the word sequence or sequences based on the first language model and the second language model.

According to the invention, the first language model can employ a word set including a disfluency as an element. In the speech recognition apparatus of the invention, the first and the second language models are defined as N-gram models, and the renewal processor can employ, as the renew numerical value, the weighted average value of the first and the second language models.

In the present invention, the speech recognition apparatus disclosed herein can be implemented in a computer system.

According to the present invention, the following speech recognition method is provided. A speech recognition method according to the present invention can include transforming one or more phoneme sequences included in speech into one or more word sequences, and providing, for the thereby obtained word sequence or sequences, an appearance probability indicating that the phoneme sequence originally represented the one or more word sequences; renewing the appearance probability provided for each of the one or more word sequences when the word sequence or sequences obtained by the transforming step include a word unique to spontaneous speech, referring to a first model, which is especially prepared for an expression unique to spontaneous speech, and a second model, which differs from the first model; and recognizing the speech by selecting the word sequence, or one of the word sequences for which the renewed appearance probability is the highest, to indicate that the phoneme sequence or sequences originally represented the selected word sequence.

In the speech recognition method of the invention, the first language model can be written in correlation with the appearance probability of a word sequence that includes a word unique to spontaneous speech with a combination of N consecutive words. Additionally, a disfluency is a typical example of the word unique to spontaneous speech.

In the speech recognition method of the invention, the renewing step can include renewing the appearance probability provided for the word sequence or sequences by referring to a third language model, which is especially prepared for specific symbols included in the word sequence or sequences. The specific symbols can include symbols such as a period, a comma, a question mark, and the like. These specific symbols can be automatically inserted.

The speech recognition method of the invention can be established as a program that permits a computer to perform a predetermined process. According to the present invention, a program is provided that permits a computer to acoustically analyze speech data and transform the speech data into a feature vector. The program further can cause the computer to generate acoustic data, for which an appearance probability is provided, for one or more phoneme sequences that may correspond to the feature vector obtained by the acoustic analysis step; transform the phoneme sequence or sequences into one or more word sequences while a disfluency is included as a word choice selection; renew the appearance probability by referring to a disfluency language model that is written by correlating the appearance probability of one or more word sequences in which a disfluency is included with a combination of N consecutive words; and recognizing the speech data using the word sequence, or one of the word sequences, for which the renewed appearance probability is the highest as a speech recognition result.

In the program of the invention, the word transforming step further can add a symbol to a word indicating that the word is a disfluency word choice in order to distinguish the word choice from another word. The symbol is added as a mark that clearly identifies the word as a disfluency, and is also used when a disfluency is to be removed automatically. In the program of the invention, the recognition step can output the word sequence to which the highest appearance probability applies as text data. Before being output, the word to which the symbol has been added is removed so that the word sequence which has the highest appearance probability can be determined to be text data. This is efficacious for the automatic removal of disfluencies and the display of text data. In the program of the invention, it is practically necessary, at the renewing step, for the appearance probability to be renewed by referring not only to the disfluency language model, but also to a general-purpose language model.

In the program of the invention, at the word transformation step, the phoneme sequence is transformed into a word sequence, while a pause included in the speech data is included as a punctuation choice. At the renewing step, the appearance probability can be renewed by further referring to a punctuation language model that is limited to punctuation insertion. This method is efficacious for the automatical insertion of punctuation.

A speech recognition method of the invention is established also as a storage medium on which a computer-readable program is stored. That is, according to the invention, a storage medium is provided on which a computer-readable program is stored that permits a computer to acoustically analyze speech data and transform the speech data into a feature vector; generate acoustic data for which an appearance probability is provided for a phoneme sequence that may correspond to the feature vector obtained at the acoustic processing step. When a disfluency is to be reflected in a recognition result, the computer-readable storage medium further can cause the computer to transform the phoneme sequence into a word sequence with a disfluency being included as a word choice. When a disfluency is not to be reflected in a recognition result, the phoneme sequence can be transformed into a word sequence without including the disfluency as a word choice.

When a disfluency is to be reflected in a recognition result, the computer-readable storage medium can cause the computer to renew the appearance probability by referring to the general-purpose language model and a disfluency language model, which is written by correlating the appearance probability of the word sequence that includes a disfluency with a combination of N consecutive words. When a disfluency is not to be reflected in a recognition result, the computer-readable storage medium can cause the computer to renew the appearance probability by referring to the general-purpose language model. The computer-readable storage medium further can cause the computer to recognize the word sequence for which the renewed appearance probability is the highest as a speech recognition result.

For the storage medium of the invention, as well as the above described program of the invention, the transforming step can include adding a symbol to a word that is a word choice for a disfluency in order to distinguish between the word and another.

For the storage medium of the invention, the disfluency language model and the general-purpose language model can be N-gram models, and at the renewing step, the appearance probability can be renewed by using the weighted average value of the disfluency language model and the general-purpose language model.

Further, the storage medium of the invention can cause the computer to automatically insert punctuation in a speech recognition result. Accordingly, at the word transformation step the phoneme sequence is transformed into a word sequence, while a pause is included as a punctuation choice in the speech data. At the renewing step, the appearance probability also can be renewed by referring to a punctuation language model that is limited to punctuation insertion.

BRIEF DESCRIPTION OF THE DRAWINGS

There are shown in the drawings, embodiments which are presently preferred, it being understood, however, that the invention is not limited to the precise arrangements and instrumentalities shown.

FIG. 3A is a diagram showing the operation of the speech recognition program of FIG. 2 for speech recognition using only a general-purpose language model.

FIG. 3B is a diagram showing the operation of the speech recognition program of FIG. 2 for speech recognition using a general-purpose language model and a disfluency language model.

FIG. 8A is a diagram showing the operation of the speech recognition program of FIG. 7 for speech recognition using only a general-purpose language model.

FIG. 8B is a diagram showing the operation of the speech recognition program of FIG. 7 for speech recognition using a general-purpose language model and a disfluency language model.

FIG. 8C is a diagram showing the operation of the speech recognition program of FIG. 7 for speech recognition using a general-purpose language model and a punctuation language model.

FIG. 8D is a diagram showing the operation of the speech recognition program of FIG. 7 for speech recognition using a general-purpose language model, a disfluency language model, and a punctuation language model.

DETAILED DESCRIPTION OF THE INVENTION

Figure 1:
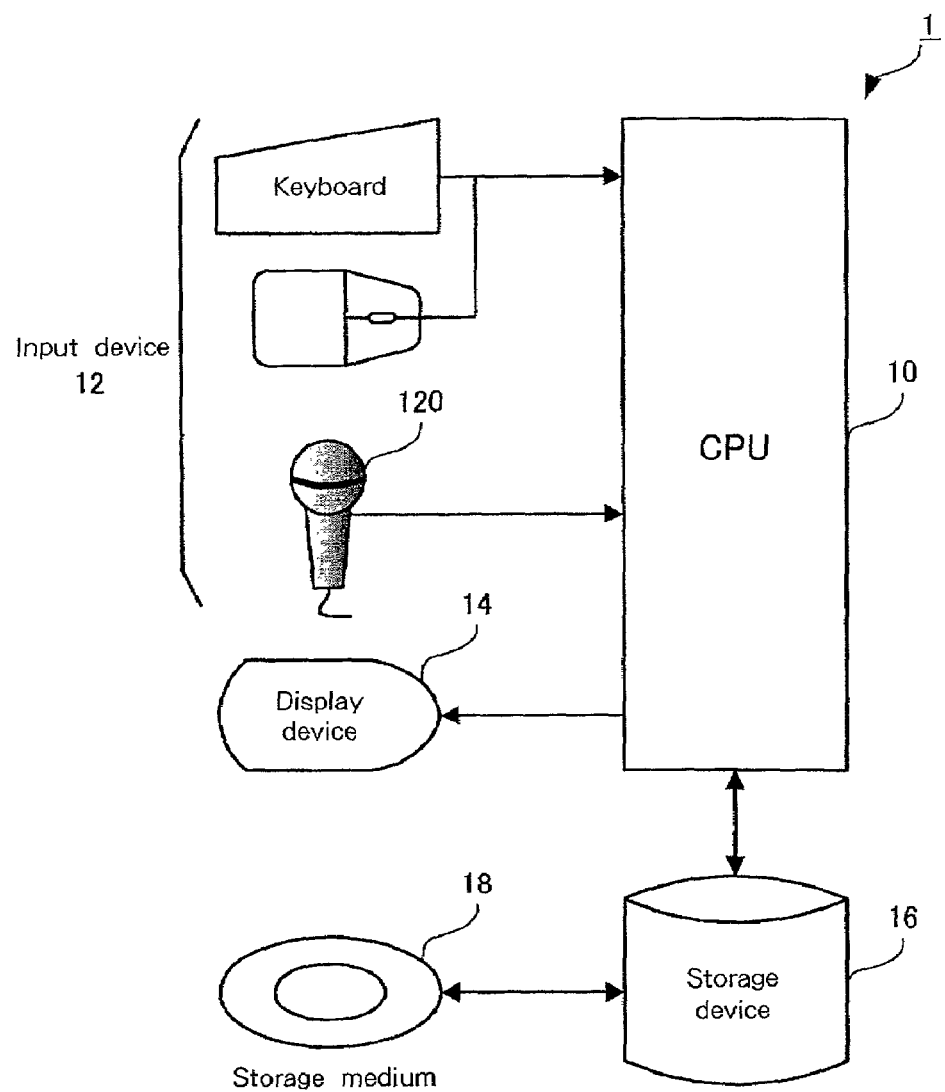
FIG. 1 is a diagram showing a configuration of a speech recognition apparatus according to a first embodiment of the invention disclosed herein.

The preferred embodiments of the present invention will now be described while referring to the accompanying drawings. FIG. 1 is a diagram showing the configuration of a speech recognition apparatus 1 according to a first embodiment. As shown in FIG. 1, the speech recognition apparatus 1 can include a CPU 10, which further can include a microprocessor, memory and peripheral circuits; an input device 12, including a mouse, a keyboard and a speech input device 120, such as a microphone; a display device 14, such as a CRT display; and a storage device 16, such as an HDD (Hard Disk Drive), a DVD (Digital Versatile Disc) device, or a CD (Compact Disk) device.

The speech recognition apparatus 1 employs a hardware configuration wherein the speech input device 120 is added to a common computer, and executes a recorded speech recognition program 2a that is supplied on a storage medium 18, such as a DVD, a CD-ROM or a CD-R. That is, the speech recognition apparatus 1 recognizes speech (speech data) that is received via the speech input device 120 and is transformed into a digital form, generates text data from which disfluencies are automatically removed, and stores the text data on the storage medium 18 that is loaded into the storage device 16, or displays the text data on the display device 14.

Figures 2, 3:
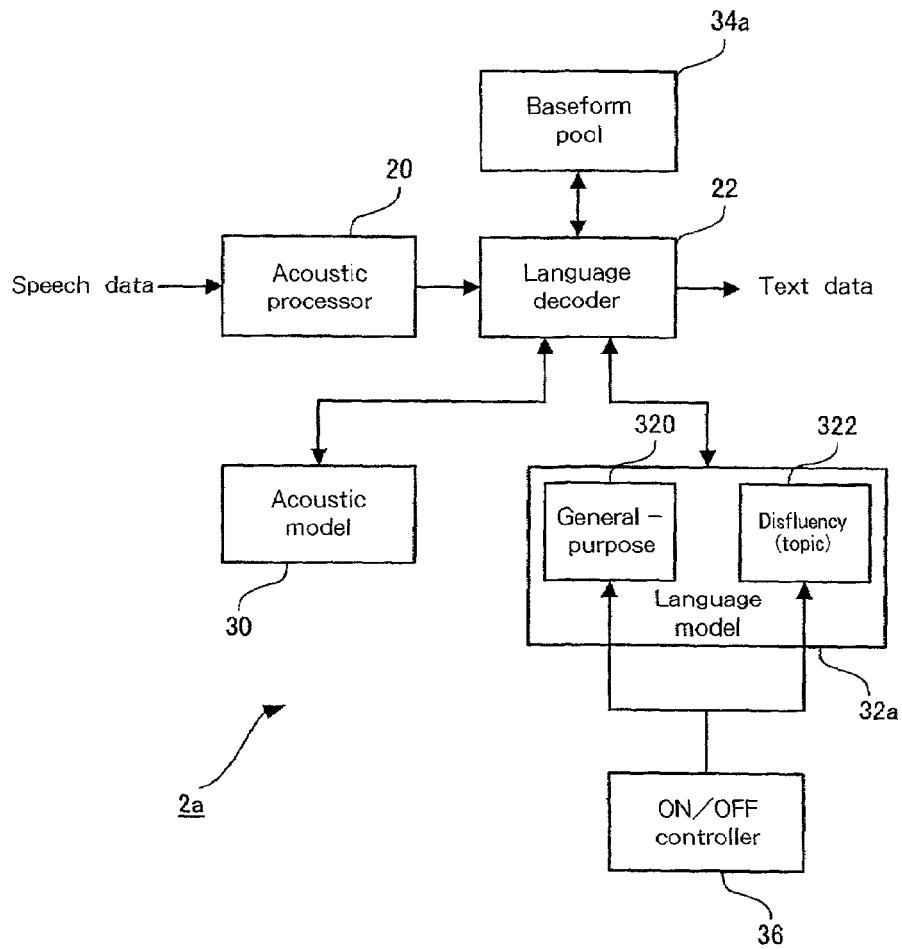
FIG. 2 is a diagram showing a configuration of a speech recognition program according to a first embodiment of the invention disclosed herein.

FIG. 2 is a diagram showing the structure of the speech recognition program 2a. As shown in FIG. 2, the speech recognition program 2a includes an acoustic processor 20, a language decoder 22, an acoustic model 30, a language model 32a, a baseform pool 34a, and an ON/OFF controller 36 for the language model 32a. The language model 32a also includes a general-purpose language model 320 and a disfluency language model (topic) 322.

The acoustic processor 20 performs a frequency analysis process and a feature extraction process, such as a Fourier transformation, for the speech data that is input at the speech input device 120, transforms the speech data into a feature vector, and outputs the feature vector to the language decoder 22. The acoustic model 30 outputs to the language decoder 22, acoustic model data wherein the appearance probability (a numerical value is increased as the probability becomes greater that a phoneme sequence represents a word sequence) of the feature vector is entered for each phoneme by using HMMs (Hidden Markov Models). The baseform pool 34a includes a general-purpose portion that corresponds to the general-purpose language model 320 of the language model 32a and a disfluency pronunciation (e.g., "er") that corresponds to the disfluency language model 322. The baseform pool 34a writes the pronunciation of each disfluency word using a phonetic symbol that is correlated with the acoustic model 30.

While N (e.g., N=3) consecutive words are employed for the appearance probability of a word or a word sequence that is generally required for speech recognition, the general-purpose language model 320 of the language model 32a is written in table form in correlation with the appearance probability. The size of the general-purpose language model 320 is normally about 60 MB. The appearance probability of the combination of words when N=3 is defined as the probability one succeeding word of two consecutive words will appear, and in the general-purpose language model 320, a disfluency is not regarded as a word to be recognized.

The disfluency language model 322 includes a word set (in the example where N= 3, "this", "is" and "er") that includes a disfluency and a word set (e.g., "you" and "know") that is related to a colloquial expression unique to spontaneous speech. Both of these word sets are prepared by scanning text that is obtained by transcribing spontaneous speech in order to learn the disfluency language model 322. A disfluency is also one of the expressions unique to spontaneous speech. While the second word set is not directly related to disfluency detection, this effectively improves the precision with which spontaneous speech is recognized, because most of the general-purpose language models 320 are obtained by learning "written words" from, for example, newspapers.

FIGS. 3A and 3B are diagrams showing the operation of the speech recognition program 2a (the language decoder 22) in FIG. 2. In FIG. 3A, speech recognition (topic OFF) is performed using only the general-purpose language model 320; the disfluency language model 322 is not used. In FIG. 3B, speech recognition (topic ON) is performed by using both the general-purpose language model 320 and the disfluency language model 322.

The language decoder 22 decodes the feature vector received from the acoustic processor 20, and outputs, to the display device 14, or the storage device 16, text data constituting a word sequence (W' in equation (2)) for which the maximum probability is calculated by the acoustic model 30, the baseform pool 34a, and the language model 32a. The text data is then displayed on the display device 14, or stored in the storage device 16. As shown in FIGS. 3A and 3B, depending on whether the disfluency language model 322 is used, the language decoder 22 automatically detects and deletes a disfluency in a manner that will be described later while referring to FIGS. 4 to 6.

The ON/OFF controller 36 controls the ON/OFF state of the disfluency language model 322 and its use. Although various control methods are available, the easiest method to use is to determine the ON/OFF state of the disfluency language model 322 in accordance with a user's instruction. To control the ON/OFF state in an automated fashion, however, language decoding need only be performed twice for one part of the speech data for a user, i.e. when the disfluency language model 322 is ON and when it is OFF. The obtained scores (likelihoods) may be compared to determine the one that is the most appropriate, so that the ON/OFF control can be exercised. This determination can be performed each time the disfluency language model 322 is used; however, since CPU 10 processing time is required to perform language decoding twice, it is preferable that the determination be performed at the time of user registration or enrollment.

In equation (2), P(S|W) is provided by the acoustic model 30 and the baseform pool 34a. P(W) is provided by the language model 32a. By using equation (1), P(W) is obtained by the weighted averaging of the general-purpose language model 320 and the disfluency language model 322 in accordance with the value for $\lambda$. When the value for $\lambda$ is changed, not only the ON/OFF state of the disfluency language model 322 can be controlled, but also the selection of the general-language model 320 or the disfluency language model 322. The importance level of the selected model also can be controlled. Generally, a system designer sets a value that, by evaluating results obtained by experiment, is assumed to be optimal; however, this value also can be adjusted by experimental decoding at the time enrollment is accomplished.

$$W' = \mathrm{argmax}_W P(W|S) = \mathrm{argmax}_W P(S|W) P(W) \tag{2}$$

where S denotes a feature vector $(S_1, S_2, \ldots, S_k)$, W denotes a word sequence $(W_1, W_2, \ldots, W_1)$ and W' denotes a word sequence $(W'_1, W'_2, \ldots, W'_1)$.

Figure 4:
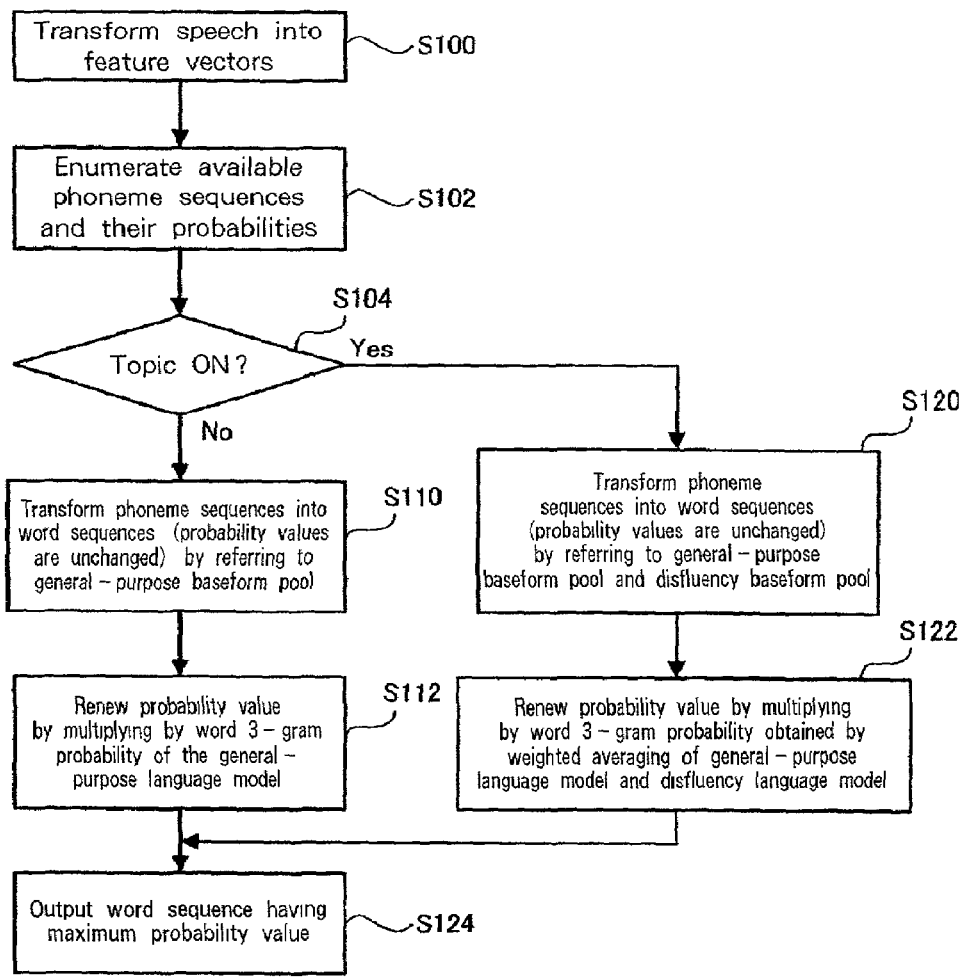
FIG. 4 is a flowchart showing the processing performed by the speech recognition program (language decoder) of FIG. 2.
Figure 5:
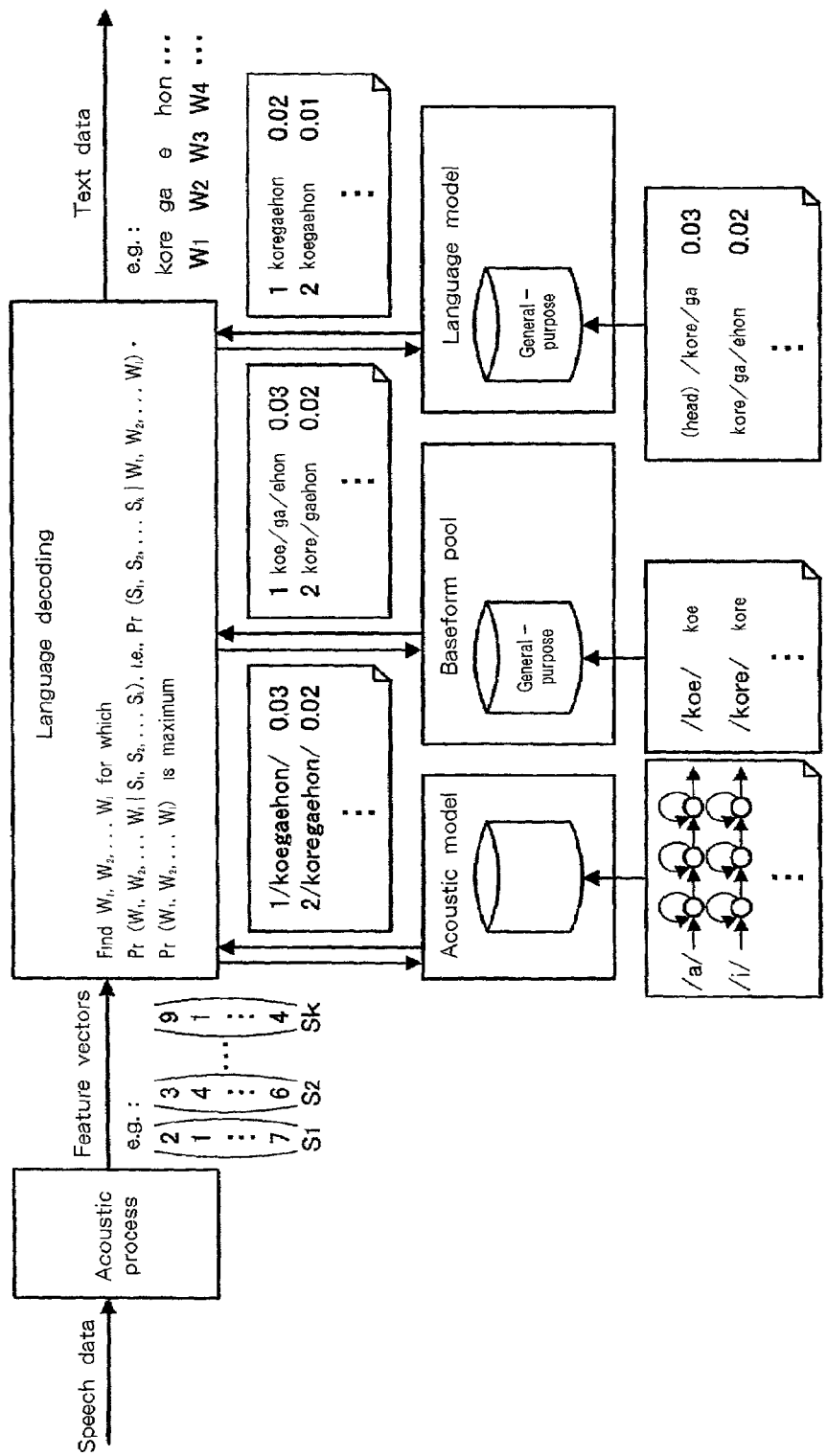
FIG. 5 is a diagram showing the operation of the speech recognition program (language decoder) of FIG. 2 wherein the disfluency language model is not used when performing automatic disfluency deletion (topic OFF).
Figure 6:
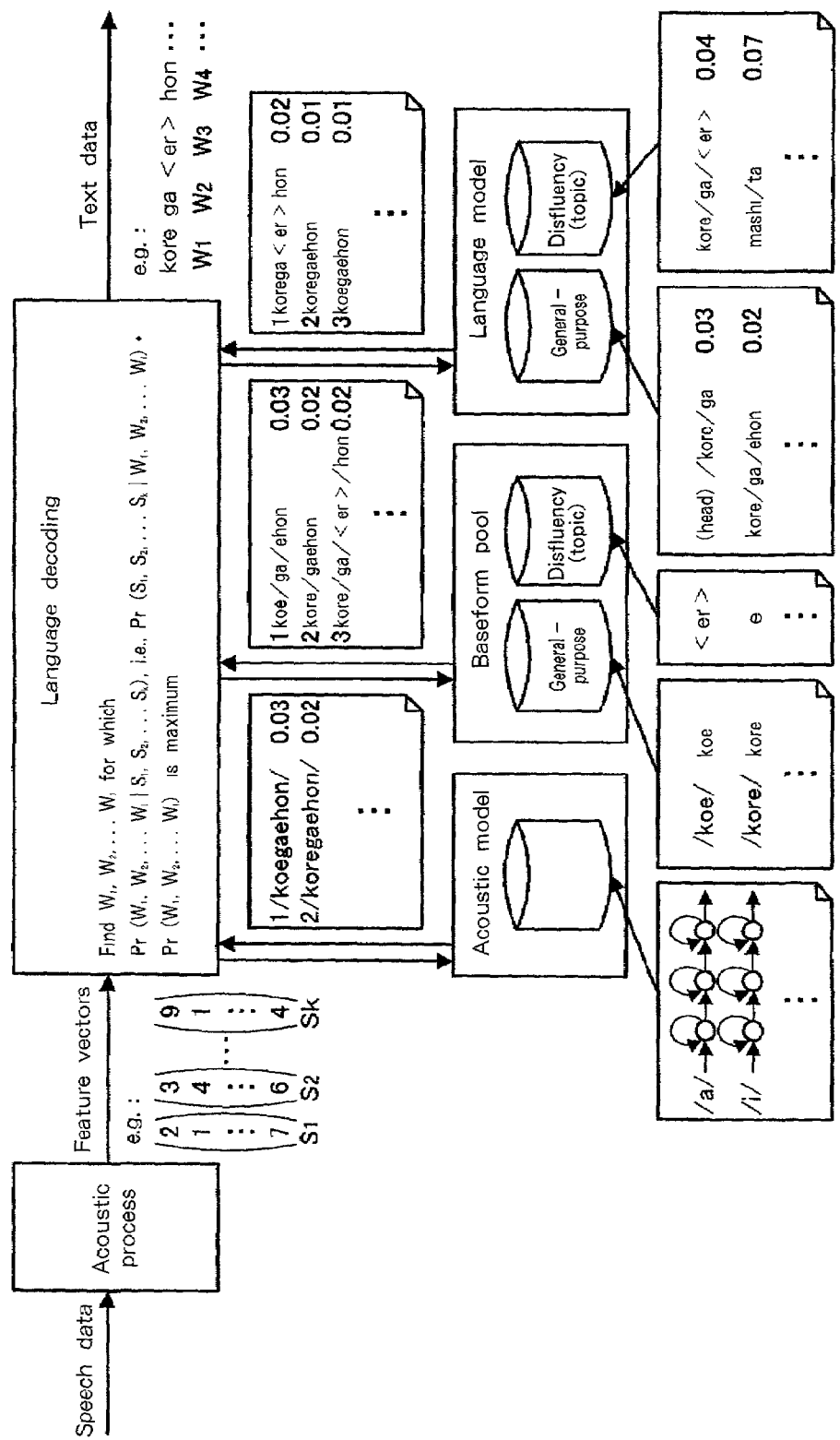
FIG. 6 is a diagram showing the operation of the speech recognition program (language decoder) of FIG. 2 wherein the disfluency language model is used when performing automatic disfluency deletion (topic ON).

The operation of the language decoder 22 will now be described in detail while referring to FIGS. 4 to 6 and by using a 3-gram as an exemplary N-gram. FIG. 4 is a flowchart showing the speech recognition processing performed by the speech recognition program 2a (language decoder 22) of FIG. 2. FIG. 5 is a diagram showing the operation of the speech recognition program 2a (language decoder 22) that does not perform automatic disfluency deleting (topic OFF) because only the general-purpose language model 320 of FIG. 2 is used. FIG. 6 is a diagram showing the operation of the speech recognition program 2a (language decoder 22) that performs the automatic deletion of disfluencies (topic ON) by using both the general-purpose language model 320 and the disfluency language model 322 of FIG. 2.

As shown in FIG. 4, at step 100 (S100 in FIG. 4; this step notation method applies hereinafter), the acoustic processor 20 transforms input speech "kore ga ehon" into feature vectors which can be output to the language decoder 22. At step 102 (S102), as shown in FIGS. 5 and 6, the language decoder 22 outputs the received feature vectors $(S_1, S_2, \ldots, S_k)$ to the acoustic model 30. The acoustic model 30 then prepares acoustic data obtained by adding the appearance probabilities to phoneme sequences (/koegaehon/ and /koregaehon/) that may correspond to the feature vectors, and returns the acoustic data to the language decoder 22.

At step 104 (S104), the language decoder 22 determines whether the disfluency automatic deletion function has been set in accordance with a user's instruction or by experimental decoding at the time of enrollment, i.e., whether the disfluency language model 322 (topic) is ON. When the automatic deletion function has not been set (the topic is OFF), the value held by $\lambda$ is set to 1 and program control advances to step 110 (S110). When the automatic deletion function has been set, the value held by $\lambda$ is set to 0 or 1, as has been determined in advance, and program control is shifted to step 120 (S120).

When the automatic deletion of disfluencies has not been set, at step 110 (S110), as shown in FIG. 5, the language decoder 22 refers only to the general-purpose portion (general-purpose baseform pool) of the baseform pool 34a to transform the phoneme sequences (/koegaehon/ and /koregaehon/) into word sequences (koe/ga/ehon and kore/ga/ehon), and determines that the word sequences are choices, while not regarding disfluencies as choices. That is, the portion /ehon/ is transformed into a common word or a set of common words that is pertinent to the baseform /ehon/. It should be noted that this transformation is performed using only the probability supplied by the acoustic model 30.

At step 112 (S112), as shown in FIG. 5, the language decoder 22 refers to only the general-purpose language model 320 to renew the appearance probabilities assigned to the word sequence choices that are obtained at step 110 (S110). In the example in FIG. 5, as a result of this processing, the probability assigned to word sequence "kore/ga/ehon" is 0.02, and the probability assigned to word sequence "koe/ga/ehon" is 0.01.

To automatically delete a disfluency, at step 120 (S120), as shown in FIG. 6, the language decoder 22 refers to both the general-purpose portion of the baseform pool 34*a* and the disfluency portion (disfluency baseform pool) written in phonetic expression of the disfluency, and transforms the phoneme sequences (/koegaehon/ and /koregaehon/) into word sequences (e.g., koe/ga/ehon, koe/ga/<er>/hon and kore/ga/<er>/hon) while including disfluencies as word choices. It should be noted that er is enclosed by angle brackets, <>, to indicate that it is a disfluency, an efficient measure for use when displaying text data from which disfluencies are to be automatically deleted.

At step 122 (S122), as shown in FIG. 6, the language decoder 22 refers to the general-purpose language model 320 and the disfluency language model 322 by weighting them in accordance with equation (1), wherein $\lambda \neq 1$, and renews the appearance probabilities assigned to the word sequence choices obtained at S110. In the example in FIG. 6, as a result of this processing, the probability assigned to word sequence "kore/ga/<er>/hon" is 0.02, and the probability assigned to each of the remaining word sequences is 0.01.

At step 124 (S124), as shown in FIGS. 5 and 6, the language decoder 22 outputs text data that represents the speech recognition result, the word sequence for which the highest probability is obtained by performing a calculation or renewing at S112 or S122. In the example in FIG. 6, "kore/ga/<er>/hon" is selected, and although in FIG. 6 <er> is displayed, the text data also can be displayed after <er> has actually been deleted. This applies for the following examples, and even when <er> appears in a display, this includes a case wherein it is not actually displayed.

The processing performed when a speaker inputs as speech "korega" "e" "hon" at the speech input device 120 (FIG. 1) of the speech recognition apparatus 1 will now be separately described for a case wherein the disfluency language model 322 is used and for a case wherein it is not used. When the disfluency language model 322 is not used, the acoustic processor 20 processes speech data for the speech that is input, and outputs to the language decoder 22, the feature vectors that describe the speech sounds. The language decoder 22, as shown in FIGS. 4 and 5, processes the feature vectors received from the acoustic processor 20 by using only the acoustic model 30 and the general-purpose language model 320, and evaluates the probabilities obtained for the acoustic model 30 and the language model 32*a* to identity "korega" as "kore/ga" and "e" "hon" as "ehon". That is, the sound "e", for which the highest probability is provided by referring to the acoustic model 30 and the language model 32*a*, is selected from the common word combinations, and as a result, in this case text data "kore/ga/ehon" is output.

When both the general-purpose language model 320 and the disfluency language model 322 are employed, the speech data is processed and the feature vectors that describe the sounds of the speech are output to the language decoder 22. Then, as shown in FIGS. 4 and 6, the language decoder 22 employs the acoustic model 30, the general-purpose language model 320, and the disfluency language model 322 to process the feature vectors received from the acoustic processor 20, evaluates the probabilities obtained by referring to the acoustic model 30 and the language model 32*a*, and identifies "korega" as "kore/ga" and "e" "hon" as "<er>" and "hon". That is, in accordance with the context, the word having the highest probability is determined for sound "e" by using the probability obtained from the language model 32*a*, while taking into account not only the common word "e", but also the disfluency "<er>". In the state in FIG. 3, when the two word sequences "kore/ga/ehon/hatsumei" and "kore/ga/<er>/hon/hatsumei" are compared, it is more easily understood that the second word sequence is assigned a higher probability.

The disfluency language model 322 is constituted by a pronunciation dictionary to which a mark indicating a disfluency is allocated, and requires a much smaller size (e.g., 2 MB) than the above described task for automatic disfluency deletion. Further, since for the automatic disfluency deleting method of this embodiment the disfluency language model 322 need merely be added as a topic, the automatic disfluency deletion function can be added without changing the general-purpose conventional system.

In addition, since the ON/OFF control does not require that the program be reset, the user can easily control the ON/OFF state of the automatic disfluency deletion function by selecting the disfluency language model 322 for this operation. Furthermore, the disfluency language model 322 also can be used with a topic that is especially prepared for another field, such as "computer", "soccer" or "baseball". For example, a topic for inserting marks, such as punctuation, also can be provided. An explanation will now be given, as a second embodiment, of an example wherein both the topic for disfluency deletion and the topic for punctuation insertion are provided.

Figure 7:
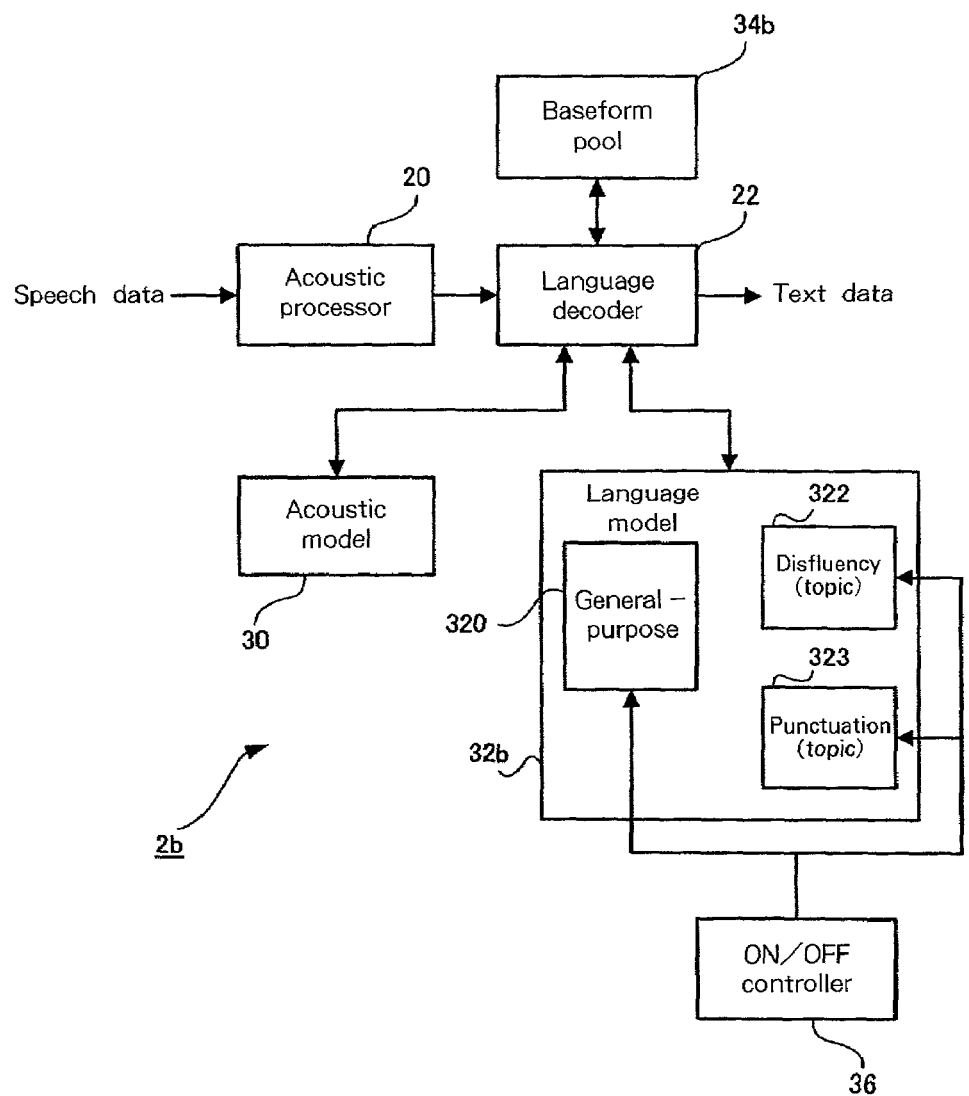
FIG. 7 is a diagram showing a configuration of a speech recognition program according to a second embodiment of the invention disclosed herein.

Since the basic configuration of a speech recognition apparatus according to a second embodiment is the same as that of the speech recognition apparatus 1 for the first embodiment, no explanation for it will be given. FIG. 7 is a diagram showing the arrangement of a speech recognition program 2*b* according to the second embodiment. Since the basic functions of the speech recognition program 2*b* are the same as those of the speech recognition program 2*a* in the first embodiment, the same reference numerals as are used for the speech recognition program 2*a* in the first embodiment are also used to denote corresponding components in FIG. 7.

The speech recognition program 2*b* differs from the speech recognition program 2*a* in that a language model 32*b* includes a punctuation language model 323 in addition to a general-purpose language model 320 and a disfluency language model 322. The speech recognition program 2*b* also differs from the speech recognition program 2*a* in that a baseform pool 34*b* corresponds to the punctuation language model 323, and includes a punctuation portion for detecting a blank (pause; corresponding to a punctuation ("." or ",")) in the acoustic model data. The contents of the baseform pool 34*b*, which are not shown in FIG. 7, will be described later.

When automatic punctuating is to be performed, the language decoder 22 regards a pause in the speech as a word. When automatic punctuating is not to be performed, the language decoder 22 does not regard the pause of the speech as a word.

Since the functions of the general-purpose language model 320 and the disfluency language model 322 of the language model 32*b* are the same as those for the first embodiment, only the punctuation language model 323 will be described. The punctuation language model 323 is a topic especially prepared for punctuation insertion. While a combination of three continuous words is employed for the appearance probability of a specific word/word sequence that is required for punctuation insertion, the punctuation language model 323 is represented in table form in correlation with the appearance probability.

The punctuation language model 323 can be regarded as a general-purpose language model 320, which is specially prepared in order to automatically insert punctuation into portions that are determined as pauses by the baseform pool 34*b*, while regarding punctuation marks as words, and for which the volume of data is reduced.

The punctuation language model 323 includes words that are selected based on the amount of mutual information for the punctuation class, e.g., following words that are positioned immediately before the punctuation marks. The following enumerated words are the upper twenty words, and Hm indicates the value of the volume of the mutual information in the punctuation class. Since the punctuation language model 323 limits the information required for punctuation insertion, generally, the amount of data can be about 1/100 to 1/1000 of that of the general-purpose language model 320.

Words in the punctuation language model 323 can include:

| Hm | words |
|---|---|
| 275.111 | iru |
| 197.166 | da |
| 160.223 | shita |
| 159.425 | desu |
| 152.889 | ha |
| 137.400 | shi |
| 137.164 | ne |
| 129.855 | de |
| 112.604 | aru |
| 103.377 | ga |
| 79.751 | masu |
| 73.160 | ka |
| 66.952 | shikashi |
| 65.562 | ori |
| 63.930 | node |
| 63.078 | mashita |
| 62.469 | imasu |
| 59.100 | daga |
| 49.474 | nai |
| 48.714 | deha |

FIGS. 8A to 8D are diagrams showing the operation of the speech recognition program 2*b* (language decoder 22) of FIG. 7. In FIG. 8A, only the general-purpose language model 320 is used for speech recognition; in FIG. 8B, the general-purpose language model 320 and the punctuation language model 323 are employed; in FIG. 8C, the general-purpose language model 320 and the disfluency language model 322 are employed; and in FIG. 8D, the general-purpose language model 320, the disfluency language model 322, and the punctuation language model 323 are employed.

The language decoder 22 decodes the feature vectors received from an acoustic processor 20, and outputs to a display device 14 or a storage device 16, text data constituting a word sequence (W' in equation (2)) for which the highest probability is obtained by the acoustic model 30, the baseform pool 34*b*, and the language model 32*b*. The text data is then displayed on the display device 14 or stored in the storage device 16.

As shown in FIGS. 8A to 8D, depending on whether the disfluency language model 322 and the punctuation language model 323 are used, the language decoder 22 automatically detects and deletes disfluencies and insert punctuations in a manner that will be described later while referring to FIGS. 9 to 13.

In equation (2), P(S|W) is provided by the acoustic model 30 and the baseform pool 34*b*, and P(W) is provided by the language model 32*b*. By using equation (1), P(W) is obtained by weighted averaging of the general-purpose language model 320, the disfluency language model 322, and the punctuation language model 323 in accordance with the value of λ. When the value of λ is changed, not only the ON/OFF states of the disfluency language model 322 and the punctuation language model 323 can be controlled, but also the selection of the general-language model 320, the disfluency language model 322, or the punctuation language model 323. Additionally, the importance level of the selected model can be controlled. Generally, a system designer sets a value which is assumed to be optimal from results obtained by experimentation; however, this value also can be adjusted by experimental decoding at the time of enrollment.

Figure 9:
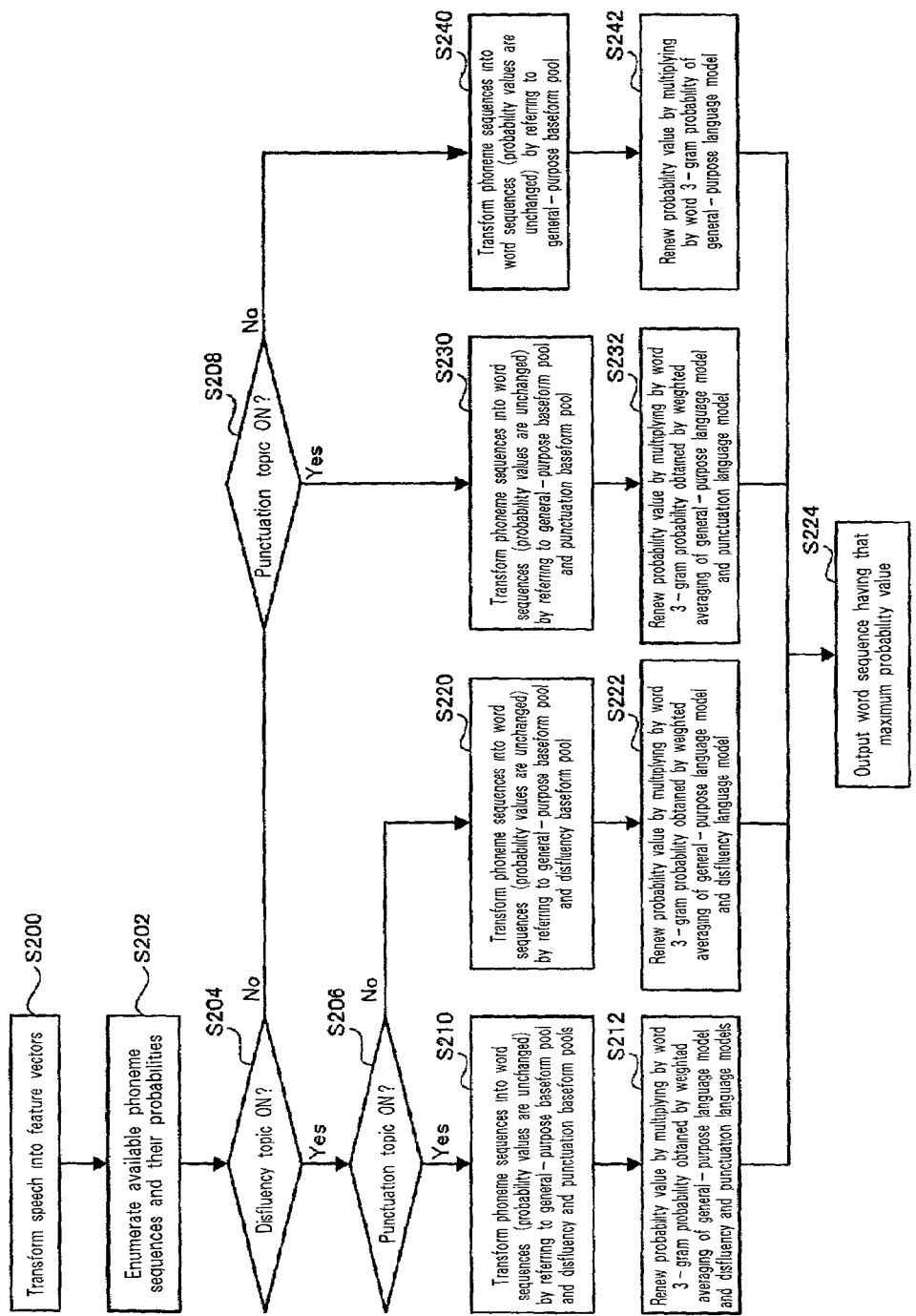
FIG. 9 is a flowchart showing the processing performed by the speech recognition program (language decoder).
Figure 10:
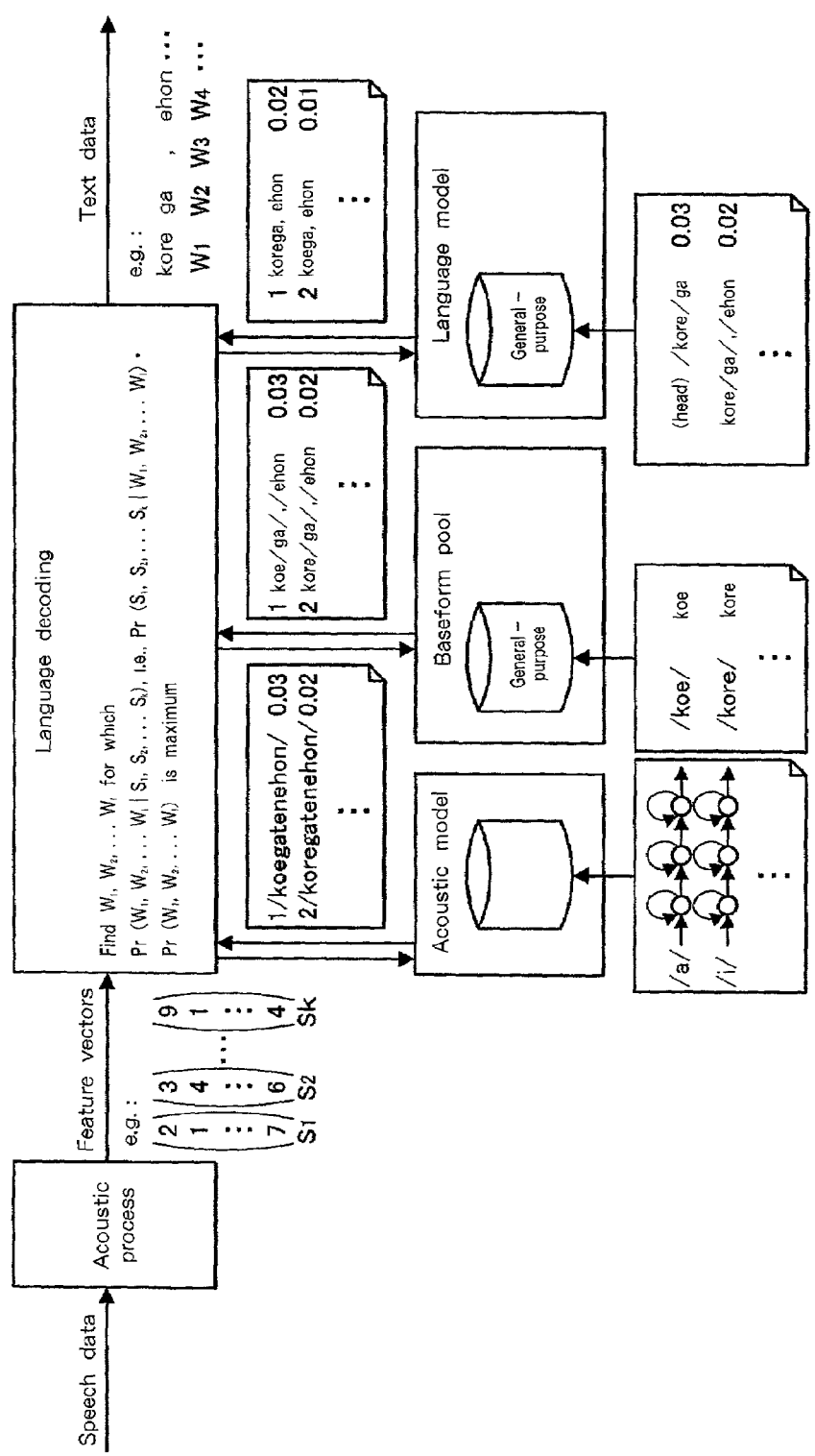
FIG. 10 is a diagram showing the speech recognition program (language decoder) of FIG. 7 wherein automatic disfluency deletion or automatic punctuating is not performed because only a general-purpose language model is used.
Figure 11:
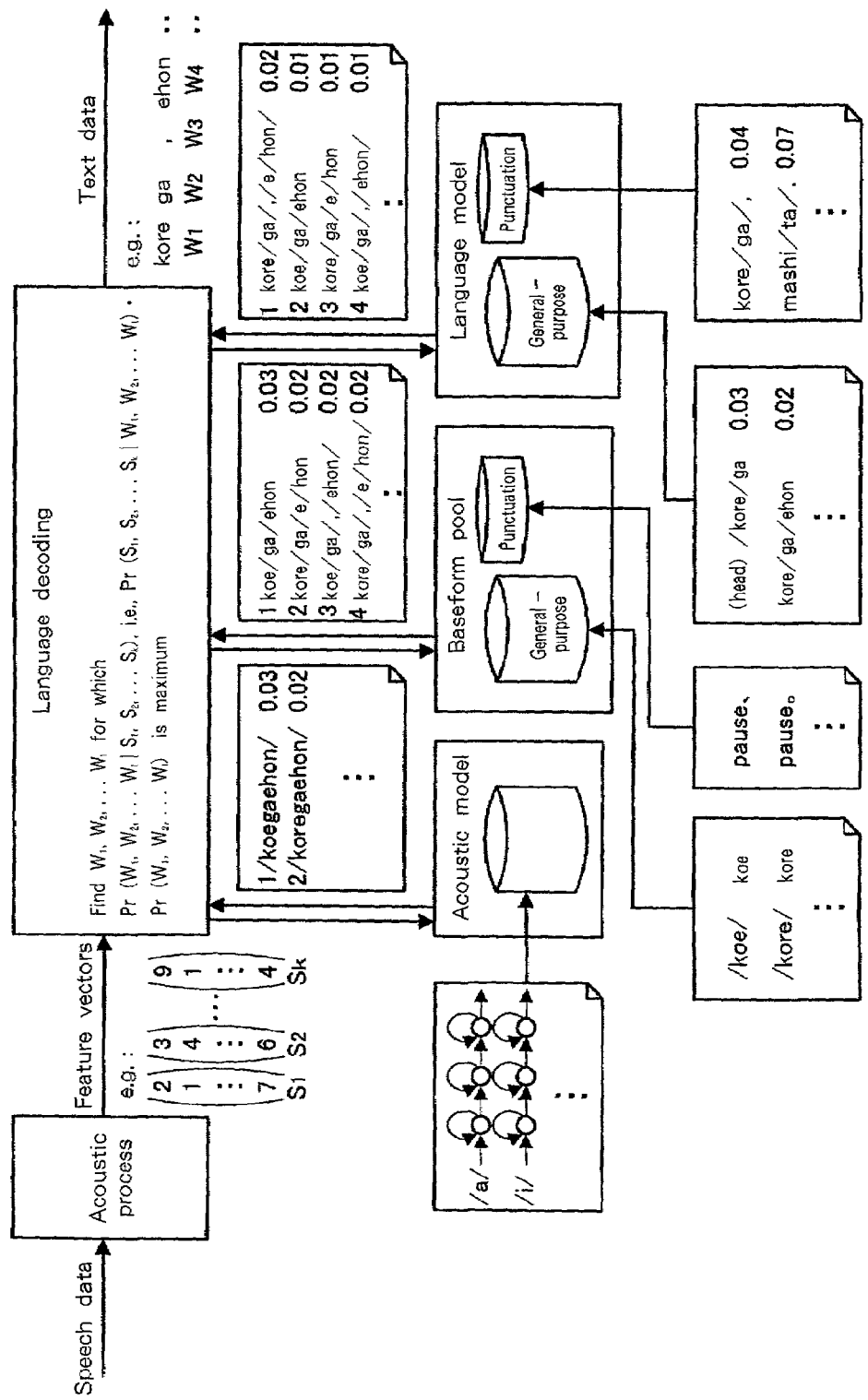
FIG. 11 is a diagram showing the speech recognition program (language decoder) of FIG. 7 wherein the general-purpose language model and the punctuation language model are used to perform automatic punctuating.
Figure 12:
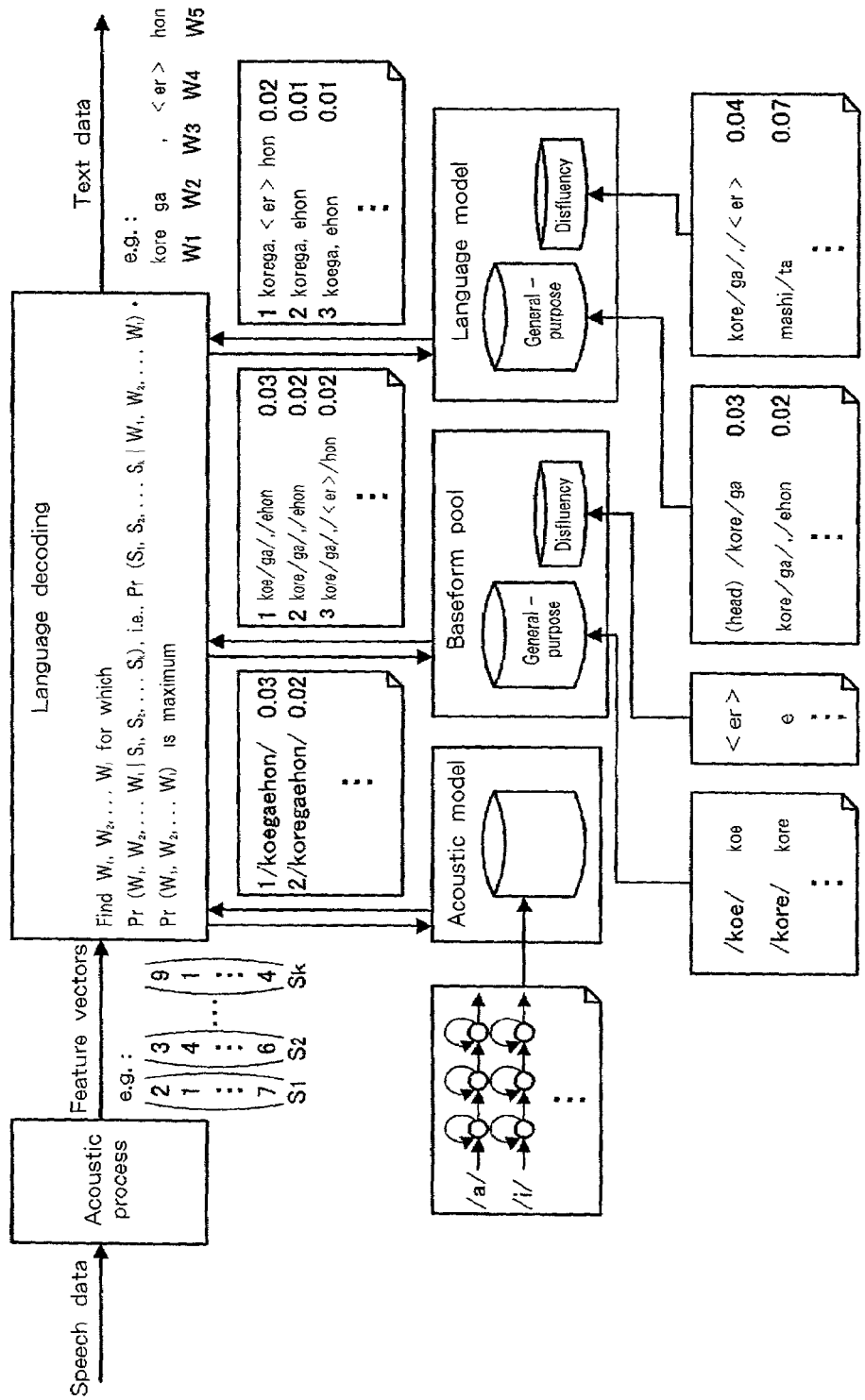
FIG. 12 is a diagram showing the speech recognition program (language decoder) of FIG. 7 wherein the general-purpose language model and the disfluency language model are used to perform automatic disfluency deletion.
Figure 13:
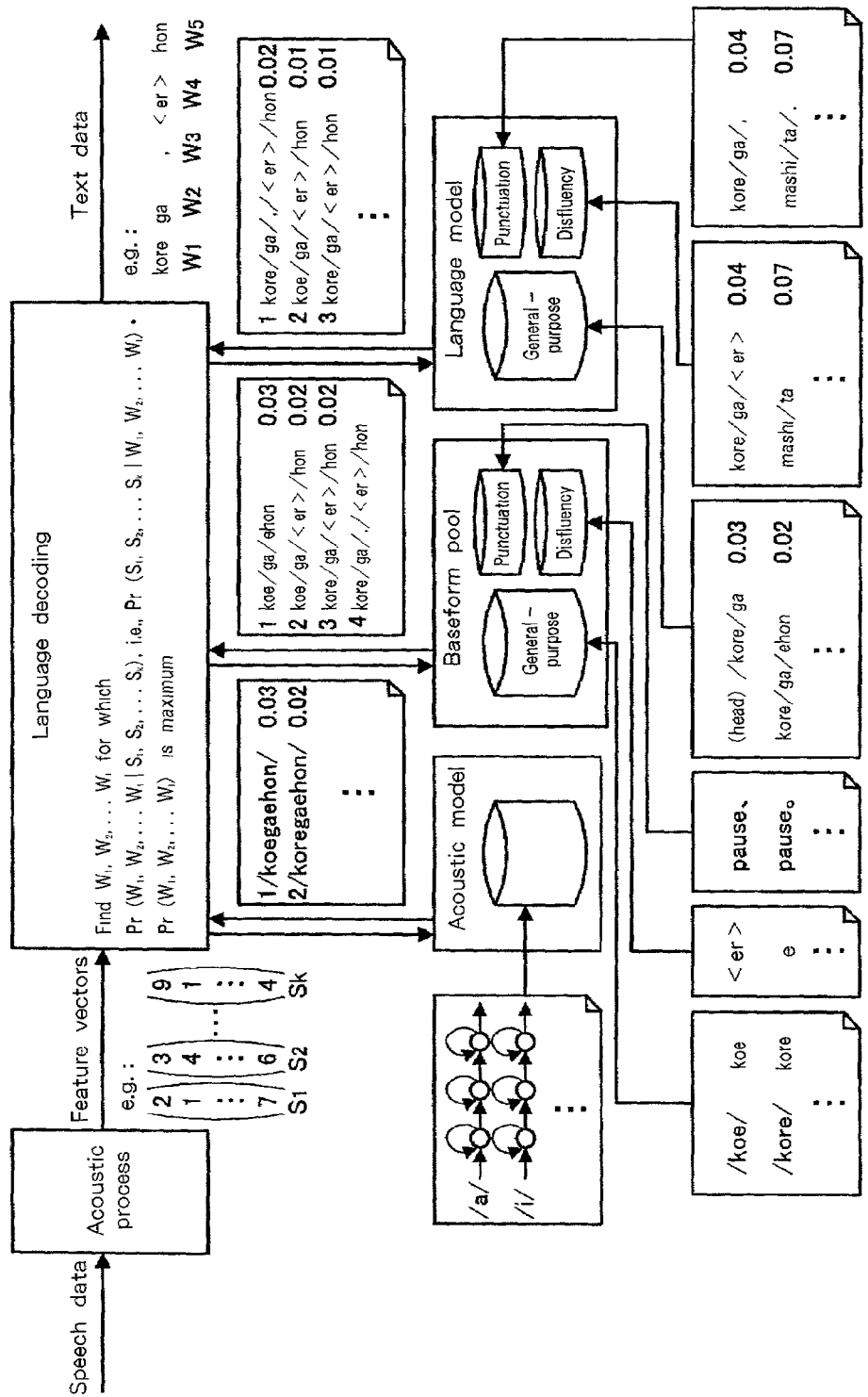
FIG. 13 is a diagram showing the speech recognition program (language decoder) of FIG. 7 wherein the general-purpose language model, the disfluency language model, and the punctuation language model are used to perform automatic disfluency deletion and automatic punctuating.

The operation of the language decoder 22 will now be described in detail while referring to FIGS. 9 to 13 and by using a 3-gram as an exemplary N-gram. FIG. 9 is a flowchart showing the speech recognition processing performed by the speech recognition program 2*b* (language decoder 22) of FIG. 7. FIG. 10 is a diagram showing the operation of the speech recognition program 2*b* (language decoder 22) that does not perform the automatic deletion of disfluencies and automatic punctuating (two topics in the OFF state) because only the general-purpose language model 320 of FIG. 7 is used. FIG. 11 is a diagram showing the operation of the speech recognition program 2*b* (language decoder 22) that performs automatic punctuating (punctuation topic in the ON state) by using the general-purpose language model 320 and the punctuation language model 323 of FIG. 7. FIG. 12 is a diagram showing the operation of the speech recognition program 2*b* (language decoder 22) that performs automatic disfluency deletion (disfluency topic in the ON state) by using the general-purpose language model 320 and the disfluency language model 322 of FIG. 7. FIG. 13 is a diagram showing the operation of the speech recognition program 2*b* (language decoder 22) that performs automatic disfluency deletion (disfluency topic in the ON state) and automatic punctuating (punctuation topic in the ON state) by using the general-purpose language model 320, the disfluency language model 322, and the punctuation language model 323 of FIG. 7.

As shown in FIG. 9, at step 200 (S200 in FIG. 9; this step notation method applies hereinafter), the acoustic processor 20 transforms the input speech "kore ga ehon" into feature vectors, and outputs them to the language decoder 22. At step 202 (S202), as shown in FIGS. 10 to 13, the language decoder 22 outputs the received feature vectors ($S_1, S_2, \ldots, S_k$) to the acoustic model 30. The acoustic model 30 prepares acoustic data obtained by adding the appearance probabilities to phoneme sequences (/koegaehon/ and /koregaehon/) that may correspond to the feature vectors, and returns the acoustic data to the language decoder 22.

At step 204 (S204), the language decoder 22 determines whether the automatic disfluency deletion function is set in accordance with an instruction issued by a user or by experimental decoding at the time of enrollment, i.e., whether the disfluency language model 322 (disfluency topic) is ON. When the automatic deletion function is not set (the disfluency topic is OFF), a value held by λ is set to 1, and program control advances to step 208 (S208). When the automatic deletion function is set, the value held by λ is set to 0 or 1, as determined in advance, and program control is shifted to step 206 (S206).

At 206 (S206), the language decoder 22 determines whether the automatic punctuating function is set in accordance with an instruction issued by the user or by experimental decoding at the time of enrollment, i.e., whether the punctuation language model 323 (punctuation topic) is ON. When the automatic punctuating function is not set (the punctuation topic is OFF), the value held by λ is set to 1, and program control advances to step 220 (S220). When the automatic punctuating function is set, the value held by λ is set to 0 or 1, as determined in advance, and program control is shifted to step 210 (S210). The process at step 210 is performed when both the disfluency topic and the punctuation topic are ON, and the process at step 220 is performed when the disfluency topic is ON.

At step 208 (S208), as well as at step 206 (S206), the language decoder 22 determines whether the punctuation language model 323 (punctuation topic) is ON. When the automatic punctuating function is not set (the punctuation topic is OFF), the value held by λ is set to 1, and program control advances to step 240 (S240). When the automatic punctuating function is set, the value held by λ is set to 0 or 1, as determined in advance, and program control is shifted to step 230 (S230). The process at step 230 is performed when the punctuation topic is ON, and the process at step 240 is performed when both the disfluency topic and the punctuation topic are OFF.

At step 240 (S240), as shown in FIG. 10, the language decoder 22 refers to only the general-purpose portion (general-purpose baseform pool) of the baseform pool 34b to transform the phoneme sequences (e.g., /koegaehon/ and /koregaehon/) into word sequences (e.g., koe/ga/,/ehon and kore/ga/,/ehon), and determines the word sequences are choices, without regarding disfluencies and pauses as choices. That is, the portion /ehon/ is transformed into a common word or a set of common words that is pertinent to the baseform /ehon/. It should be noted that this transformation is performed by using only the probability provided by the acoustic model 30.

At step 242 (S242), as shown in FIG. 10, the language decoder 22 refers only to the general-purpose language model 320 to renew the appearance probabilities of the word sequence choices that are obtained at step 220 (S220). In the example in FIG. 10, as a result of this processing, the probability assigned to word sequence "kore/ga/,/ehon" is 0.02, and the probability assigned to word sequence "koe/ga/,/ehon" is 0.01.

At step 230 (S230), as shown in FIG. 11, the language decoder 22 refers to both the general-purpose baseform pool and the punctuation portion (punctuation topic) for pause detection, which are included in the baseform pool 34b, to transform the phoneme sequences (e.g., /koegaehon/ and /koregaehon/) into word sequences (e.g., koe/ga/ehon, /kore/ga/e/hon/, /koe/ga/,/ehon/, /kore/ga/,/e/hon), while regarding pauses as words.

At step 232 (S232), as shown in FIG. 11, the language decoder 22 refers to the general-purpose language model 320 and the punctuation language model 323 by weighted averaging of them in accordance with equation (1), wherein λ≠1, and renews the appearance probabilities assigned to the word sequence choices that are obtained at step 230 (S230). In the example in FIG. 11, as a result of this processing, the probability assigned to word sequence "/kore/ga/,/e/hon/" is 0.02, and the probability assigned to each of the other word sequences is 0.01.

At step 220 (S220), as shown in FIG. 12, the language decoder 22 refers to both the general-purpose baseform pool of the baseform pool 34b and the disfluency portion (disfluency topic) thereof that is written expressed in phonetic symbols, and transforms the phoneme sequences (e.g., /koegaehon/ and /koregaehon/) into word sequences (e.g., koe/ ga/,/ehon, kore/ga/,/ehon and kore/ga/,/<er>/hon), while regarding disfluencies as word choices. As when the topic is OFF, this transformation is performed by using only the probability provided by the acoustic model 30.

At step 222 (S222), as shown in FIG. 12, the language decoder 22 refers to the general-purpose language model 320 and the disfluency language model 322 by weighting them in accordance with equation (1), wherein λ≠1, and renews the appearance probabilities assigned to the word sequence choices obtained at S220. In the example in FIG. 12, as a result of this processing, the probability assigned to word sequence "kore/ga/,/<er>/hon" is 0.02, and the probability assigned to each of the remaining word sequences is 0.01.

At step 210 (S210), as shown in FIG. 13, the language decoder 22 refers to the general-purpose baseform pool, the disfluency portion (disfluency topic) and the punctuation portion (punctuation topic) included in the baseform pool 34b, and transforms the phoneme sequences (e.g., /koegaehon/ and /koregaehon/) into word sequences (e.g., koe/ga/ ehon, kore/ga/<er>/hon and kore/ga/,/<er>/hon), while regarding disfluencies and pauses as word choices.

At step 212 (S212), as shown in FIG. 13, the language decoder 22 refers to the general-purpose language model 320, the disfluency language model 322 and the punctuation language model 323 by weighting them in accordance with equation (1), wherein λ≠1, and renews the appearance probabilities assigned to the word sequence choices obtained at S210. In the example in FIG. 13, as a result of this processing, the probability assigned to word sequence "kore/ ga/,/<er>/hon" is 0.02, and the probability assigned to each of the remaining word sequences is 0.01.

At step 224 (S224), as shown in FIGS. 10 to 13, the language decoder 22 sequentially outputs as text data representing the speech recognition results, the word sequences for which the assigned appearance probabilities are the highest as the renewing results obtained at S212, S222, S232 and S242.

The operation of the speech recognition apparatus 1 (FIG. 1 or 7) for the second embodiment will now be explained while referring to FIGS. 8A to 8D. When the disfluency language model 322 and the punctuation language model 323 are not employed (λ=1), and when a speaker inputs, at the speech input device 120 (FIG. 1) of the speech recognition apparatus 1, speech consisting of, for example, "korega" "pause (indicates no sound; this applies hereinafter)" "ten" "e" "honhatsumeino" "pause" "youten", as shown in FIG. 8A, the acoustic processor 20 outputs the feature vectors that represent this speech.

As shown in FIGS. 7 and 10, the language decoder 22 (FIG. 2) employs only the acoustic model 30 and the general-purpose language model 320 to process the feature vectors received from the acoustic processor 20, and evaluates the probabilities supplied by the acoustic model 30 and the general-purpose language model 320. Thus, the language decoder 22 identifies "korega" as "kore/ga", "ten" following "pause" as comma ",", "e" "hon" as "e-hon", and "hatsumeino" as "hatsu-mei no". Further, since "ten" and "maru" do not follow the "pause" following "honhatsumeino", the language decoder 22 identifies the succeeding "youten" as "you-ten", and outputs, as the identification results, the text data "kore ga, e-hon-hatsu-mei no you-ten".

As shown in FIG. 8B, when the disfluency language model 322 is not employed (λ=1), and when at the speech input device 120 (FIG. 1) of the speech recognition apparatus 1 a speaker inputs "korega" "pause" "e" "honhatsumeino" "pause" "youten", the acoustic processor 20 outputs, to the language decoder 22, the feature vectors that represent the phonemes of the speech.

As shown in FIGS. 7 and 11, the language decoder 22 (FIG. 2) employs the acoustic model 30, the general-purpose language model 320, and the punctuation language model 323 to process the feature vectors received from the acoustic processor 20, and evaluates the probability obtained from the acoustic model 30 and the probability obtained from the general-purpose language model 320 and the punctuation language model 323. Thus, the language decoder 22 identifies "korega" as "kore/ga", "pause" following "ga" as comma ",", "e" "hon" as "e-hon", and "hatsumeino" as "hatsu-mei no". Further, since "pause" follows "hatsumeino" and normally no punctuation follows "no", the language decoder 22 identifies the succeeding "youten" as "you-ten", not inserting punctuation at the "pause" portion, and outputs, as the identification results, the text data "kore ga, e-hon-hatsu-mei no you-ten".

As shown in FIG. 8C, when the punctuation language model 323 is not employed (λ=1), and when at the speech input device 120 (FIG. 1) of the speech recognition apparatus 1 a speaker inputs "korega" "pause" "ten" "e" "honhatsumeino" "pause" "youten", the acoustic processor 20 outputs, to the language decoder 22, the feature vectors that represent the phonemes of the speech.

As shown in FIGS. 7 and 12, the language decoder 22 (FIG. 2) employs the general-purpose language model 320 and the disfluency language model 322 to process the feature vectors received from the acoustic processor 20, and evaluates the probability obtained from the acoustic model 30, and the probability obtained from the general-purpose language model 320 and the disfluency language model 322. Thus, the language decoder 22 identifies "korega" as "kore/ga", "ten" following "pause" as comma ",", and "e" "hon" as "<er>" "hon". That is, a word that in context has a higher probability is determined by referring to the probabilities obtained from the language model 32b, while taking into account that not only the normal word "e" but also the disfluency "<er>" may be applied for sound "e". Further, since neither "ten" nor "maru" follows the "pause" following "hatsumeino", the language decoder 22 identifies the succeeding "youten" as "you-ten", and outputs, as the identification results, the text data "kore ga, <er> hon-hatsu-mei no you-ten". In the condition shown in FIG. 8C, when the two word sequences "kore/ga/,/ehon/hatsumei" and "kore/ga/,/<er>/hon/hatsumei" are compared, it is easily understood that of the two, the second word sequence is the most probable.

As shown in FIG. 8D, when the disfluency language model 322 and the punctuation language model 323 are employed (λ≠1), and when, unlike the above case, at the speech input device 120 (FIG. 1) of the speech recognition apparatus 1 a speaker inputs "korega" "pause" "e" "honhatsumeino" "pause" "youten" excluding "ten", the acoustic processor 20 outputs, to the language decoder 22, the feature vectors that represent the phonemes of the speech.

As shown in FIGS. 7 and 12, the language decoder 22 (FIG. 2) employs the acoustic model 30, the general-purpose language model 320, the disfluency language model 322, and the punctuation language model 323 to process the feature vectors received from the acoustic processor 20, and evaluates the probability obtained from the acoustic model 30, and the probability provided by the general-purpose language model 320, the disfluency language model 322, and the punctuation language model 323. Thus, the language decoder 22 identifies "korega" as "kore/ga", "pause", which follows "ga" in "korega", as comma ",", and "e" "hon" as "<er>" "hon". That is, a word that in context has a higher probability is determined by referring to the probabilities obtained from the language model 32b, while taking into account not only that the normal word "e" but also the disfluency "<er>" may be applied for the sound "e". In the condition shown in FIG. 8D, when the two word sequences "kore/ga/,/ehon/hatsumei" and "kore/ga/,/<er>/hon/hatsumei" are compared, it is easily understood that of the two, the second word sequence is most probable. In addition, since "pause" follows "hatsumeino" and generally no punctuation follows "no", the language decoder 22 does not insert punctuation into the "pause" portion. Similar to the case wherein the punctuation language model 323 is not employed, the language decoder 22 identifies the input speech accurately as "korega, <er> hon-hatsu-mei no youten", and outputs it as the text data that is the identification result.

According to the second embodiment, the following effects are obtained in addition to those obtained by the first embodiment. The automatic punctuating function can be added to the conventional general-purpose system without changing the system substantially. Further, without resetting the program, the user can turn on or off the automatic punctuating function merely by selecting or not selecting the automatic punctuating topic.

Furthermore, when a change in the frequency of the punctuation inserted depends on the content of a document, according to the punctuation insertion method of the embodiment, the appearance frequency of the punctuation can be easily changed by adjusting the weight used in the linear interpolation with the general-purpose language model 320.

The present invention has been explained by referring to two embodiments. These embodiments are provided for the Japanese language. However, the disfluency processing can be applied not only to Japanese, but also to other foreign languages, such as English. Thus, an example will be given wherein a disfluency affects English speech recognition results. "She devised remedial measures." is used as an example sentence, which is translated into "kano-jo ha zen-go-saku wo kanga-e da-shita" in Japanese. Assuming that a speaker voices the disfluency <uh> between "She" and "devised", <uh> "devised" may be erroneously recognized as "advised". When the embodiments of the present invention are employed for such an English sentence, and when the disfluency language model 322 is OFF, the system recognizes "She advised remedial measures." When the disfluency language model 322 is ON, the system recognizes "She devised remedial measures."

As described above, according to the present invention, when a general-purpose language model in addition to a vocabulary/language model especially prepared for disfluencies and punctuation marks is employed, disfluencies can be deleted from appropriate positions in sentences; and, marks, such as punctuation marks, can be inserted.

What is claimed is:

1. A speech recognition apparatus comprising:
a transformation processor configured to transform at least one phoneme sequence included in speech into at least one word sequence, and to provide, for said word sequence, an appearance probability indicating that said phoneme sequence originally represented said word sequence;
a renewal processor configured to renew said appearance probability, provided for said word sequence by said transformation processor, based on a renewed numerical value indicated by language models corresponding to said word sequence provided by said transformation processor; and a recognition processor configured to recognize speech by selecting one of said word sequences for which the renewed appearance probability is the highest to indicate that said phoneme sequence originally represented said selected word sequence;

wherein said renewal processor calculates said renewed numerical value using a first language model, which is especially prepared for expressions unique to spontaneous speech, and a second language model, which differs from said first language model, and employs said renewed numerical value to renew said appearance probability, wherein said first language model and second language model are utilized together to detect disfluencies and to automatically remove the disfluencies from said at least one word sequence, and wherein the renewed numerical value adjusts the appearance probability for a word sequence that results from the detected disfluencies being removed.

2. The speech recognition apparatus according to claim 1, wherein said first language model represents a probability that said word sequence, which includes a predetermined word included in an expression unique to spontaneous speech, is said word sequence or said originally represented phoneme sequence.

3. The speech recognition apparatus according to claim 2, wherein, when said predetermined word is included in the speech recognition results, said transformation processor transforms said phoneme sequence into a word sequence including said predetermined word, and said renewal processor renews the appearance probabilities of said word sequence based on said first language model and said second language model.

4. The speech recognition apparatus according to claim 1, wherein said first language model employs, as an element, a word set including a plurality of disfluencies and wherein said first language model is configured to be turned off using an associated on/off controller, said speech recognition apparatus not automatically removing the disfluencies from said at least one word sequence when said first language model is turned off.

5. The speech recognition apparatus according to claim 1, wherein said first and said second language models are defined as N-gram models, and wherein said renewal processor employs, as said renewed numerical value, the weighted average value of said first and said second language models.

6. A computer system comprising the speech recognition apparatus according to claim 1.

7. A speech recognition method comprising;

transforming at least one phoneme sequence included in speech into at least one word sequence, and providing an appearance probability for said obtained word sequence indicating that said phoneme sequence originally represented said word sequence;

renewing said appearance probability provided for each of said word sequences when said word sequence obtained at said transformation step include a word unique to spontaneous speech, referring to a first model, which is especially prepared for an expression unique to spontaneous speech, and a second model, which differs from said first model; and recognizing said speech and selecting one of said word sequences for which the renewed appearance probability is the highest, to indicate that said phoneme sequence originally represented said selected word sequence, wherein said first model and second model are utilized together to detect disfluencies and to automatically remove the disfluencies from said at least one word sequence, and wherein said appearance probability is adjusted in said renewing step for a word sequence that results from the detected disfluencies being removed.

8. The speech recognition method according to claim 7, further comprising:

writing said first language model in correlation with the appearance probability of a word sequence which includes a word unique to spontaneous speech with a combination of N consecutive words.

9. The speech recognition method according to claim 8, wherein said word unique to spontaneous speech is a disfluency and wherein said first language model is configured to be turned off using an associated on/off controller, said speech recognition method not automatically removing the disfluencies from said at least one word sequence when said first language model is turned off.

10. The speech recognition method according to claim 7, wherein said renewing step further comprises:

renewing said appearance probability provided for said word sequence by referring to a third language model, which is especially prepared for specific symbols included in said word sequence or sequences.

11. A program embodied on a computer readable medium that permits a computer to perform:

acoustically analyzing speech data and transforming said speech data into a feature vector;

generating acoustic data, for which an appearance probability is provided, for at least one phoneme sequence that may correspond to said feature vector obtained from said analyzing step;

transforming said phoneme sequence into at least one word sequence, while a disfluency is included as a word choice selection;

renewing said appearance probability by referring to a disfluency language model that is written by correlating the appearance probability of at least one word sequence in which a disfluency is included with a combination of N consecutive words, wherein the renewing step also refers to a second language model not including disfluencies, wherein said renewing step results in at least one sequence of words in which said disfluency is not included; and speech recognizing said speech data by using as a speech recognition result one of said word sequences for which the renewed appearance probability is the highest, wherein said disfluency language model and said second model are utilized together to detect disfluencies and to automatically remove the disfluencies.

12. The program embodied on a computer readable medium according to claim 11, wherein said transforming step further comprises:

adding a symbol to a word indicating that said word is a disfluency choice to distinguish said word choice from another word.

13. The program embodied on a computer readable medium according to claim 11, wherein said speech recognizing step further comprises:

outputting said word sequence to which the highest appearance probability applies as text data.

14. The program embodied on a computer readable medium according to claim 12, wherein said speech recognizing step further comprises;

removing said word to which said symbol has been added from said word sequence having the highest appearance probability, and outputting the resultant word sequence as text data.

15. The program embodied on a computer readable medium according to claim 11, wherein said renewing step further comprises:

renewing said appearance probability by referring to said disfluency language model and to a general-purpose language model.

16. The program embodied on a computer readable medium according to claim 11, wherein said transforming step further comprises:

transforming said phoneme sequence into a word sequence, while a pause included in said speech data is included as a punctuation choice, and renewing said appearance probability by further referring to a punctuation language model that is limited to punctuation insertion.

17. A machine-readable storage medium, having stored thereon a computer program having a plurality of code sections executable by a machine for causing the machine to perform the steps of:

acoustically analyzing speech data and transforming said speech data into a feature vector;

generating acoustic data, for which an appearance probability is provided, for a phoneme sequence that may correspond to said feature vector obtained by said analyzing step;

if a disfluency is to be reflected in a recognition result, transforming said phoneme sequence into a word sequence, with a disfluency being included as a word choice, or if a disfluency is not to be reflected in a recognition result, transforming said phoneme sequence into a word sequence without including said disfluency as a word choice;

if a disfluency is to be reflected in a recognition result, renewing said appearance probability by referring to the general-purpose language model and a disfluency language model, which is written by correlating the appearance probability of said word sequence that includes a disfluency with a combination of N consecutive words, or if a disfluency is not to be reflected in a recognition result renewing said appearance probability by referring to the general-purpose language model; and speech recognizing said speech data by using said word sequence for which the renewed appearance probability is the highest as a speech recognition result, wherein said general-purpose language model and disfluency language model are utilized together to detect disfluencies and to automatically remove the disfluencies from said at least one word sequence, and wherein said disfluency language model is configured to be turned off using an associated on/off controller, said computer program not automatically removing the disfluencies when said disfluency language model is turned off.

18. The machine-readable storage medium according to claim 17, wherein said transforming step further comprises:

adding a symbol to a word indicating that said word is a disfluency word choice to distinguish between said word and another.

19. The machine-readable storage medium according to claim 17, wherein said disfluency language model and said general-purpose language model are N-gram models; and wherein, at said renewing step, said appearance probability is renewed by using the weighted average value of said disfluency language model and said general-purpose language model.

20. The machine-readable storage medium according to claim 17, wherein said transforming step further comprises:

transforming said phoneme sequence into a word sequence, while a pause is included as a punctuation choice in said speech data, and renewing said appearance probability by referring to a punctuation language model that is limited to punctuation insertion, to automatically insert punctuation in a speech recognition result.

* * * * *